Aug. 3, 1943.   J. A. FORBES   2,325,846
BRAKING APPARATUS
Filed Aug. 15, 1941
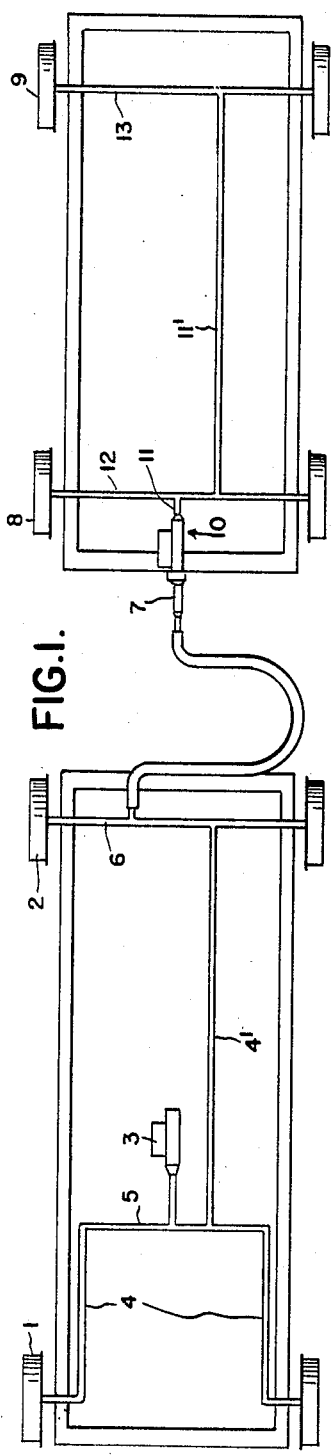
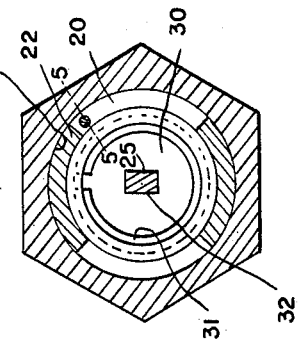
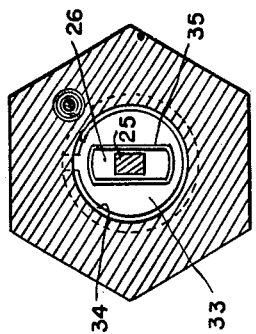
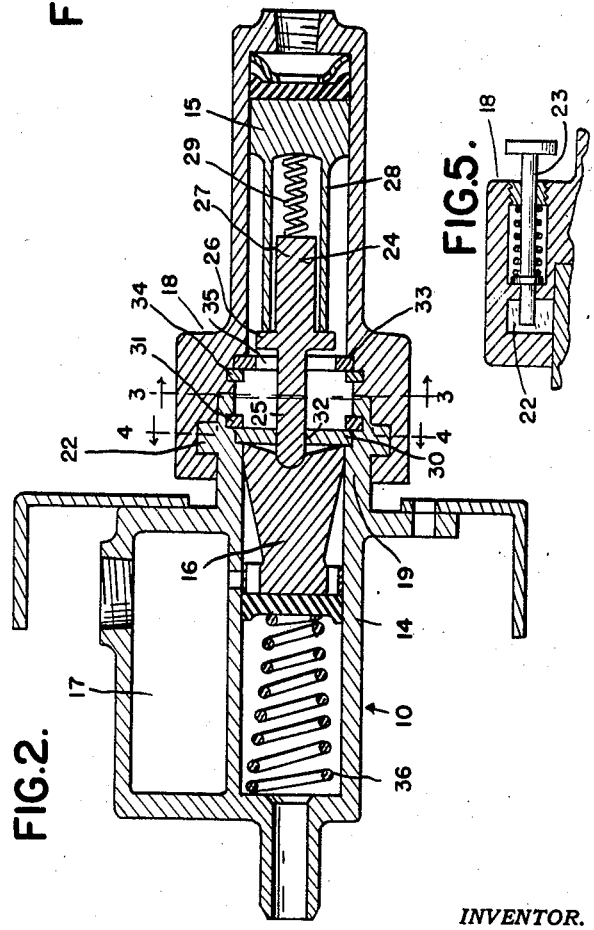
INVENTOR.
JOSEPH A. FORBES
BY
ATTORNEYS

Patented Aug. 3, 1943

2,325,846

UNITED STATES PATENT OFFICE 2,325,846

BRAKING APPARATUS

Joseph A. Forbes, Detroit, Mich., assignor to Kelsey-Hayes Wheel Company, Detroit, Mich., a corporation of Delaware Application August 15, 1941, Serial No. 407,050

6 Claims. (Cl. 188—3)

The invention relates to braking apparatus and refers more particularly to hydraulic braking apparatus for tractor and trailer vehicles having individual or separate and self-contained brake systems so arranged that the pressure on the tractor brake system can be transmitted to the trailer brake system.

The invention has for one object to provide an improved coupling for the brake systems which may be readily operated.

The invention has for another object to so construct the coupling that certain of its parts are relatively angularly movable to detachably connect one with the other and the parts in their different relative positions function to permit the transmission of pressure from one brake system to the other and to make each system self-contained.

The invention has for a further object to so construct the coupling that its parts which are more liable to be damaged are protected when the parts of the coupling are connected or disconnected.

These and other objects of the invention will become apparent from the following description, taken in connection with the accompanying drawing, in which Figure 1 is a diagrammatic view of tractor and trailer vehicles having individual brake systems connected by a coupling embodying my invention;

Figure 2 is a central vertical section through the coupling;

Figures 3 and 4 are cross sections on the lines 3—3 and 4—4, respectively, of Figure 2;

Figure 5 is a cross section on the line 5—5 of Figure 4.

As shown diagrammatically in Figure 1, 1 and 2 represent the front and rear wheel brake drums of a tractor within which are located suitable hydraulically operated brake friction means engageable with the drums. Inasmuch as the brake friction means forms no part of the present invention and different types are well known, the same are not shown in detail. 3 is a master cylinder of standard construction mounted on the chassis of the tractor and operatively connected to the wheel cylinders of the brake friction means for the front and rear wheel brakes by the longitudinally extending tubings 4 and 4' and the transversely extending tubings 5 and 6. The tubing 4 is connected at its rear end to the cylinder 7. Figure 1 also diagrammatically shows the front and rear brake drums 8 and 9, respectively, of the trailer within which are located suitable hydraulically operated brake friction means which may be of the same construction as those for the tractor. 10 represents a master cylinder suitably mounted on the chassis of the trailer and operatively connected to the front and rear wheel cylinders by the longitudinally extending tubings 11 and 11' and the transversely extending tubings 12 and 13. The brake systems for the tractor and trailer are individual or separate and self-contained and, as shown particularly in Figure 2, the cylinder 7 of the tractor brake system and the cylinder 14 of the master cylinder 10 of the trailer brake system have located therewithin the pistons 15 and 16, respectively, to prevent leakage of the braking liquid from the brake systems. The master cylinder 10 is formed with the braking liquid reservoir 17 which contains excess braking liquid for replenishing the brake system of the trailer. In this connection, the construction of the master cylinder 10, as thus far described, is standard.

The coupling embodying my invention is adapted to detachably connect the cylinder 7 to the cylinder 14 by a relative angular movement of the two cylinders, the cylinder 7 being preferably angularly movable and the cylinder 14 being preferably fixed. In detail, the cylinder 7 has fixed to its rear end the extension 18 and the cylinder 14 has fixed to its front end the extension 19, the two extensions being substantially axially aligned when the parts of the coupling are connected. The extension 18 is formed with the diametrically opposite arcuate recesses 20 which extend longitudinally forwardly from its rear end and with the diametrically opposite arcuate grooves 21 which connect into the corresponding ends of the recesses. The extension 19 is provided with the diametrically opposite radially outwardly extending integral wings 22 of a size to enter the recesses 20 and then the grooves 21 upon angular movement of the cylinder 7 relative to the cylinder 14. Suitable means, such as the locking bolt 23 extending axially of and slidable in the extension 18 is engageable with the rear edge of a wing 22 of the extension 19 to hold the extensions from accidental relative angular movement permitting their disengagement. The locking bolt is resiliently urged to locking position by a suitable coil spring. 24 is a plunger between the pistons 15 and 16 for transmitting the braking pressure exerted upon the piston 15 to the piston 16. The plunger is formed with the polygonal shank 25, the polygonal enlargement 26 at the front end of the shank, and the cylindrical base 27 in front of the enlargement and slidably extending into the tubular extension 28 of the piston 15. 29 is a coil spring between the piston and the plunger located within the extension of the piston. 30 is a disc keyed within the extension 19 and held in place by the transversely split spring 31. The disc is provided with the centrally located polygonal opening 32 of the same contour as that of the shank 25 and of a size to slidably receive the shank so that its rear end may abut the front end of the piston 16. 33 is a disc keyed within the extension 18 and held in place by the transversely split spring 34. The disc 33 has the polygonal opening 35 which is of the same contour as the polygonal enlargement 26 and of a size to freely receive the same. It will be noted that the openings in both discs 30 and 33 are of greater height than width. It will also be noted that the width of the opening 35 in the disc 33 is sufficient to permit angularly moving or turning the disc 33 through 90° about the shank 25 of the plunger. When the extensions 18 and 19 are detachably connected, the opening 35 registers with the enlargement 26 of the plunger to allow the enlargement to pass through the opening either when braking pressure is being applied or removed, the strength of the coil spring 36 in the master cylinder being greater than the strength of the coil spring 29. When the braking pressure has been removed, the piston 16 abuts the disc 30 and it is held from further forward movement. Also, the enlargement 26 of the plunger is spaced forwardly of the disc 33 so that after the locking dog 23 has been released the cylinder 7 and its extension 18 may be angularly moved or turned to unlocking position during which the disc 33 is also angularly moved or turned so that its opening 35 no longer registers with the enlargement 26, but extends at right angles. As a result, when the cylinder 7 and its extension 18 are moved forwardly and the extension 18 is disengaged from the extension 19, the enlargement 26 is forced against the disc 33 by the coil spring 29 and the disc holds the plunger from any further rearward movement. It will be noted that at this time the plunger is still located within the extension 18 so that the latter is protected.

What I claim as my invention is:

1. In a braking apparatus for tractor and trailer vehicles having individual fluid pressure operated brake systems each comprising a cylinder and a piston therewithin, a coupling for the systems comprising substantially axially aligned extensions fixed on said cylinders and relatively angularly movable for detachably connecting one to the other, a plunger between said pistons for moving one with the other, means on one of said extensions for holding said plunger from angular movement relative thereto, and means on and angularly movable with the other of said extensions relative to the first mentioned extension providing clearance for said plunger when said extensions are detachably connected and forming a stop for said plunger when said extensions occupy a relative angular position for detachment from each other.

2. In a braking apparatus for vehicles having individual fluid pressure operated brake systems each comprising a cylinder and a piston therewithin, a coupling for the systems comprising substantially axially aligned extensions fixed on said cylinders and relatively angularly movable for detachably connecting one to the other, a plunger between said pistons for moving one with the other, said plunger having a polygonal shank and a polygonal enlargement at one end of said shank, a disc on one of said extensions having a polygonal opening for receiving said shank, a second disc fixed to the other of said extensions having a polygonal opening registering with said enlargement to receive the same when said extensions are detachably connected, said last mentioned disc having its opening out of registration with said enlargement when said extensions occupy a relative angular position for detachment from each other whereby said last mentioned disc forms a stop for said plunger.

3. In a braking apparatus for tractor and trailer vehicles having individual fluid pressure operated brake systems each comprising a cylinder and a piston therewithin serving to prevent leakage of fluid, a coupling for the systems comprising substantially axially aligned fixed and angularly movable extensions fixedly secured to said cylinders and detachably connected to each other, a plunger carried by the piston within said angularly movable cylinder and engageable with the other of said pistons when said extensions are detachably connected, said plunger having a polygonal shank and a polygonal enlargement at an end of said shank engageable with said last mentioned piston, a spring between said last mentioned piston and plunger, a disc on said fixed extension having a polygonal opening for receiving said shank, a second disc on and movable with said angularly movable extension having a polygonal opening registering with said enlargement to receive the same when said extensions are detachably connected, said last mentioned disc having its opening out of registration with said enlargement when said extensions occupy a relative angular position for detachment from each other whereby said last mentioned disc forms a stop for said plunger.

4. In a braking apparatus for vehicles having individual fluid pressure operated brake systems, each comprising a cylinder member and a piston therewithin, said cylinder members being relatively angularly movable for detachably connecting one to the other, a plunger between said pistons for moving one longitudinally with the other when said cylinder members are connected, fixed means on one of said cylinder members for holding said plunger from angular movement relative to said last mentioned cylinder member during relative angular movement of said cylinder members, and fixed means on the other of said cylinder members clearing said plunger when said cylinder members are connected and forming a stop for limiting longitudinal movement of said plunger when said cylinder members occupy a relative angular position for detachment from each other.

5. In a braking apparatus for vehicles having individual fluid pressure operated brake systems each comprising a cylinder member and a piston therewithin, said cylinder members being relatively angularly movable for detachably connecting one to the other, cooperating means on said cylinder members for detachably connecting the same in one position of relative angular movement, a plunger between said pistons for moving one with the other when said cylinder members are detachably connected, said plunger having a transverse shouldered portion and a member on and angularly movable with one of said cylinder members relative to said plunger, said member providing clearance for said plunger and its shouldered portion when said cylinder members are detachably connected, said member being engageable with said shouldered portion to limit movement of said plunger when said cylinder members occupy a relative angular position for detachment from each other, said shouldered portion being positioned on said plunger and said member being positioned on said one of said cylinder members whereby said plunger is held within said one of said cylinder members when said member engages said shouldered portion.

6. In a braking apparatus for vehicles having individual fluid pressure operated brake systems each comprising a cylinder member and a piston therewithin, said cylinder members being relatively angularly movable for detachably connecting one to the other, cooperating means on said cylinder members for detachably connecting the same in one position of relative angular movement, a plunger between said pistons for moving one with the other when said cylinder members are detachably connected, said plunger having a transverse shouldered portion, and a fixed member on and angularly movable with one of said cylinder members relative to said plunger, said fixed member providing clearance for said plunger and its shouldered portion when said cylinder members are detachably connected, said fixed member being engageable with said shouldered portion to limit movement of said plunger when said cylinder members occupy a relative angular position for detachment from each other.

JOSEPH A. FORBES.